(12) United States Patent
Song et al.

(10) Patent No.: US 8,817,607 B2
(45) Date of Patent: Aug. 26, 2014

(54) SIP BASED SESSION SETUP METHOD AND TERMINAL THEREOF

(75) Inventors: Jae-Seung Song, Seoul (KR); Kyung-Ae Yoon, Gyeonggi-Do (KR); Mi-Seon Ra, Seoul (KR); Hyun-Sook Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1574 days.

(21) Appl. No.: 11/908,596

(22) PCT Filed: Apr. 28, 2006

(86) PCT No.: PCT/KR2006/001604
§ 371 (c)(1),
(2), (4) Date: Sep. 13, 2007

(87) PCT Pub. No.: WO2006/118397
PCT Pub. Date: Nov. 9, 2006

(65) Prior Publication Data
US 2008/0192733 A1 Aug. 14, 2008

Related U.S. Application Data

(60) Provisional application No. 60/677,144, filed on May 2, 2005, provisional application No. 60/692,452, filed on Jun. 21, 2005.

(51) Int. Cl.
*H04L 12/66* (2006.01)
*H04L 29/06* (2006.01)
*H04L 29/08* (2006.01)

(52) U.S. Cl.
CPC ............ *H04L 65/1016* (2013.01); *H04L 69/24* (2013.01); *H04L 65/1006* (2013.01); *H04L 65/1069* (2013.01); *H04L 67/303* (2013.01); *Y10S 370/912* (2013.01)
USPC ............................ 370/229; 370/912; 370/355

(58) Field of Classification Search
CPC ............ H04L 65/1016; H04L 65/1006; H04L 65/105; H04L 29/06027
See application file for complete search history.

(56) References Cited

U.S. PATENT DOCUMENTS 6,434,143 B1     8/2002   Donovan
2002/0141358 A1* 10/2002  Requena ...................... 370/329
(Continued)

FOREIGN PATENT DOCUMENTS

WO      WO 01/84790 A1     11/2001

OTHER PUBLICATIONS

SI et al., "A Survey on the Core Technique and Research Development in SIP Standard", Journal of Software, vol. 16, No. 2, 2005, pp. 239-250.

*Primary Examiner* — Asad Nawaz
*Assistant Examiner* — Jason Harley
(74) *Attorney, Agent, or Firm* — Birch, Stewart, Kolasch & Birch, LLP (57) ABSTRACT

A Session Initiation Protocol (SIP) based session setup method and an terminal thereof, wherein the SIP based session setup method, in a session setup process performed between terminals in a SIP based network which includes at least one or more of the terminals and at least one or more entities, comprises sending a SIP INVITE message from a first terminal to a second terminal, receiving and analyzing the SIP INVITE message by the second terminal, and including a certain service condition in a SIP RESPONSE message, by the second terminal, and sending the SIP RESPONSE message including the service condition to the first terminal.

2 Claims, 6 Drawing Sheets

IMS Architecture

(56) References Cited

U.S. PATENT DOCUMENTS

| | | |
|---|---|---|
| 2002/0141404 A1 | 10/2002 | Wengrovitz |
| 2002/0181495 A1 | 12/2002 | Requena et al. |
| 2003/0035401 A1* | 2/2003 | Shaheen et al. ............... 370/341 |
| 2003/0043740 A1* | 3/2003 | March et al. .................. 370/229 |
| 2004/0015589 A1 | 1/2004 | Isozu |
| 2004/0028080 A1* | 2/2004 | Samarasinghe et al. ...... 370/486 |
| 2004/0152444 A1* | 8/2004 | Lialiamou et al. ............ 455/406 |
| 2004/0187021 A1 | 9/2004 | Rasanen |
| 2005/0009520 A1* | 1/2005 | Herrero et al. ............. 455/435.1 |
| 2005/0025047 A1* | 2/2005 | Bodin et al. ................... 370/229 |
| 2005/0228899 A1* | 10/2005 | Wendkos et al. .............. 709/232 |
| 2005/0243870 A1* | 11/2005 | Balogh et al. ................. 370/522 |
| 2006/0089966 A1* | 4/2006 | Stille et al. .................... 709/203 |
| 2008/0056234 A1* | 3/2008 | Sprague ........................ 370/352 |
| 2008/0062997 A1* | 3/2008 | Nix ........................... 370/395.2 |

\* cited by examiner

```
INVITE 128.16.64.19/65729 S:P/2.0
Path : IN IP4 UDP 239.128.16.254 1 16
Path : IN IP4 UDP 131.215.131.131 1
Path : IN IP4 UDP 128.16.64.19.1
From : mjh@isi.edu
To : schoolexample@lge.com
Content-type : meta/s0ll
Content-Length : 187
BLANK LINE
V=0
O=user1 53655765 2353687637 IN IP4 128.3.4.5
S=Mbone Audio
i=Discussion of Mbone Engeneering Issues
E=mbone@somewhere.com
C=IN IP4 224.2.0.1/127
T=0 0
M=audio 3456 RTP/AVP 0
```

Fig. 5

Audio is rejected and text is media format which is current supportable or preferable

Fig. 6

| |
|---|
| INVITE sip:marconi@radio.org SIP/2.0 |
| Via: SIP/2.0/UDP lab.high-voltage.org:5060<br>To: G. Marconi <sip:Marconi@radio.org><br>From: Nikola Tesla <sip:n.tesla@high-voltage.org><br>Call-ID: 123456789@lab.high-voltage.org<br>CSeq: 1 INVITE<br>Subject: About That Power Outage...<br>Contact: sip:n.tesla@high-voltage.org<br>Content-type: application/sdp<br>Content-Length: 158 |
| CRLF |
| v=0<br>o=Tesla 2890844526 2890844526 IN IP4 lab.high-voltage.org<br>s=Phone Call<br>c=IN IP4 100.101.102.103<br>t=0 0<br>m=audio 49170 RTP/AVP 0<br>a=rtpmap:0 PCMU/8000 |

● CRLF is used to divide between two headers and between header and body.
● header has a form of "header: value', and value and next value are divided by space.
● Request-URI: indicates resources to which request is to be sent
● Via: terminal generating request or terminal forwarding request registers its address or host name in via header. (i.e., using for registering SIP routing information)
● Call-ID: [unique string value in randomly selected local]@[host name or address] To: request destination, From: request originator
● Call can be distinguished globally -> same value is used in one call.
● Call leg: used to divide To+From+Call-ID *Call (because of establishing multiple calls among parties)
● Cseq: does not have to initial value of 1 but uses integer value.
●    Increased for re-INVITE -> upon modifying session parameter, distinguished from retransmitted INVITE.
● Subject: part used by a user not by SIP, used for subject display in terminal or for message sorting.
● Content-type, content-length: designates type and size of message body / TCP transfers message through stream and thus correct size of Boy must be described. UDP transfers data by packet unit and thus one packet must include SIP message.

Fig. 7

| |
|---|
| SIP/2.0 Negative Reject Type (4XX or 6XX etc) |
| Contact: sip:marconi@radio.org<br>Content-type: application/sdp<br>Content-Length: 155 |
| CRLF |
| ...<br>Indicate service condition which terminating terminal requests (i.e., currently supportable capability information or preferable capability information)... |

UE#1: originating user equipment or originating terminal
UE#2: terminating user equipment or terminating terminal

Fig. 11

SIP BASED SESSION SETUP METHOD AND TERMINAL THEREOF

TECHNICAL FIELD

The present invention relates to a Session Initiation Protocol (SIP) based session setup, and particularly, to a SIP based session setup method in order to use an IMS service, and an terminal thereof.

BACKGROUND ART

Internet Protocol (IP) Multimedia Subsystems (IMS) refers to a core network technology related to 'A11 IP' which integrates (unifies) wired and wireless communication environments. The IMS was introduced by a Third Generation Partnership Project (3GPP) which develops global specifications of a wireless communication. The IMS adapts an infrastructure for providing an IP multimedia service.

An IMS based service aims to compositively provide multimedia data such as voices, audio, video, data and the like based upon the IP protocol, and to construct an infrastructure in which services can rapidly be developed and varied.

An introduction of an A11 IP based network through the IMS is mainly directed to receiving abundant contents and new service capabilities which are provided using a packet service into an integrated network.

A logical structure of the A11 IP network is roughly classified into a radio network domain, a GPRS based packet switched service domain and an IP multimedia service domain. Explanations will be given for each construction of the A11 IP network as follows.

First, the radio network domain is constituted with a mobile terminal which refers to a service user, a node B managing a connection of the mobile terminal via a wireless interval, and a node such as a Radio Network Controller (RNC) and the like, The GPRS based packet service domain is constituted with a serving GPRS support node (SGSN) and a gateway GPRS support node (GGSN) for managing a user packet data delivery between a wireless access network domain and an external network or an Instant Message (IM) service domain, managing a mobility of the mobile terminal and providing a PDP content activation service.

Figure 1:
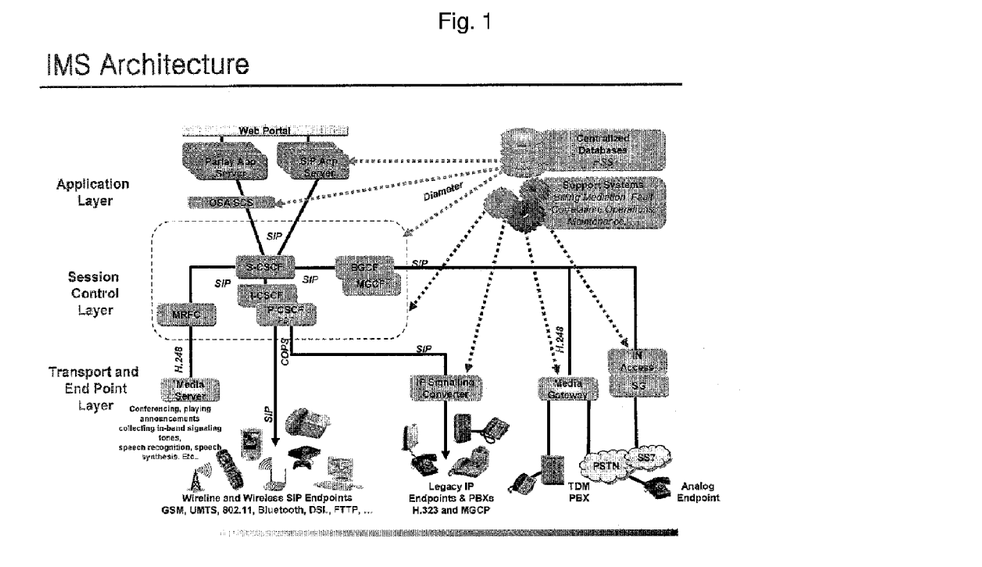
FIG. 1 is a view illustrating a structure of an IMS domain communication network.

FIG. 1 illustrates a structure of an IMS domain communication network.

As illustrated in FIG. 1, the IMS domain is constituted with a Serving-Call Session Control Function (S-CSCF) for managing a multimedia call processing function and a registration using a SIP protocol developed by an Internet Engineering Task Force (IETF), and a Home Subscriber Server (HSS) for implementing a Home Location Register (HLR) function of a related art mobile network and a function related to an IP multimedia user s mobility and to authentication, the two functions being integrated with each other. Besides, the A11 IP network may further include a Media GateWay (MGW) for controlling a media gateway to thus interwork a signaling and a call control with a related art PSTN network, for supporting multimedia to thus control the GGSN and bearers for multiple multimedia conference services, and for managing a circuit bearer and a packet media stream channel.

Functions defined in the IMS domain in the logical structure of the A11 IP network will be explained with reference to FIG. 1.

Figure 2:
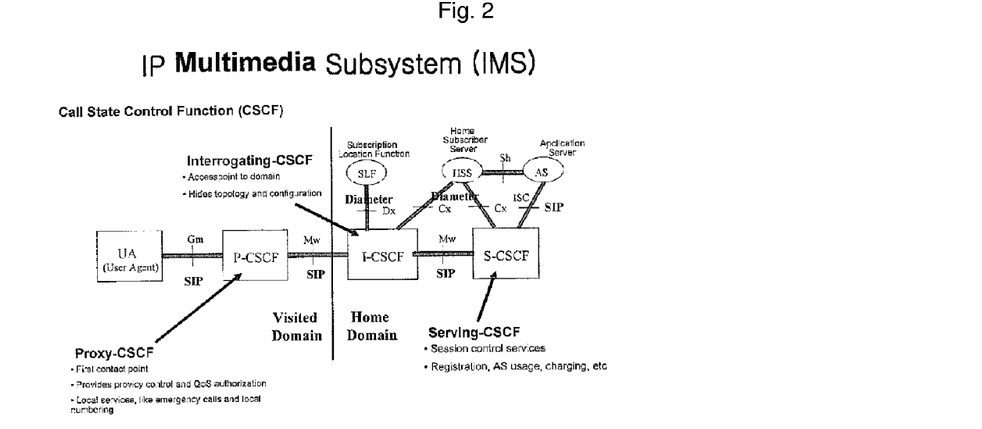
FIG. 2 is a view illustrating a schematic structure for functions of an IMS domain.

FIG. 2 illustrates a schematic structure of functions of an IMS domain.

As illustrated in FIG. 2, the IMS domain may includes a Proxy Call Session Control Function (P-CSCF), an Interrogation Call Session Control Function (I-CSCF) and a Service Call Session Control Function (S-CSCF). First, the P-CSCF denotes a first access point at which the user accesses the IMS network, and exists in same domain as one the GGSN exists in. The P-CSCF acts as a proxy and a user agent and transfers a SIP registration request message received from the user to the I-CSCF with reference to the user's home domain. The P-CSCF also transfers a SIP message received from the user to the S-CSCF using an S-CSCF address received by a registration procedure, and then requests the SIP message from the user or responses to the user with respect to the SIP message. In order to use the IMS service, a session setup is required via a negotiation process for transmitting and receiving capabilities and preferences among end users using the SIP. Once setting the session, actual bearers are established among the end users terminals to thus enable a data exchange among the end users.

In addition, the IMS uses a SIP/SDP protocol provided by the IETF to thus manage the session. That is, the IMS can support an end-to-end multimedia service based upon the SIP. Hereinafter, the SIP/SDP protocol will now be explained in more detail.

The SIP denotes a signaling protocol of an application level defining procedures for finding locations of each of intelligent terminals which are to communicate together on an Internet by identifying each of them, and generating, deleting and changing a multimedia communication session among the intelligent terminals. In the communication using the SIP, a caller sends a message in a text format to a callee in order to generate (set) a new session with the callee or to make the callee participate in a previously established session. The setup session may substantially include contents which are described in one or more media formats such as audio, video, text or white board, to therefor use an Internet Protocol (IP) referred to as a Session Description Protocol (SDP).

TABLE 1

| Type of message | Value | Function |
|---|---|---|
| INVITE | 1xx | Information |
| ACK | 2xx | Success |
| BYE | 3xx | Redirection |
| CANCEL | 4xx | Client Error |
| RESIGER | 5xx | Server Error |
| OPTION | 6xx | Global Error |

Table 1 indicates types of the SIP messages and functions thereof. As shown in Table 1, each type of the messages is divided based upon a first digit (e.g., 1xx for the INVITE, and 4xx for the CANCEL) of a value corresponding to the message. All of the SIP message is composed in a text format. Upon sending a particular message, one TCP segment or a UDP datagram allows several messages to be sent by use of a Transmission Control Protocol (TCP) or a User Datagram Protocol (UDP).

Figure 3:
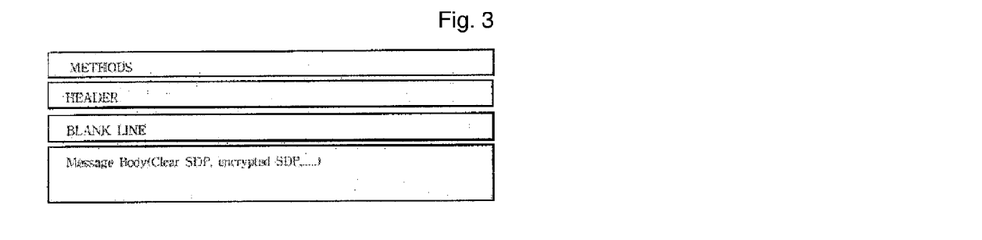
FIG. 3 is a view illustrating an exemplary format of a SIP message.
Figure 4:
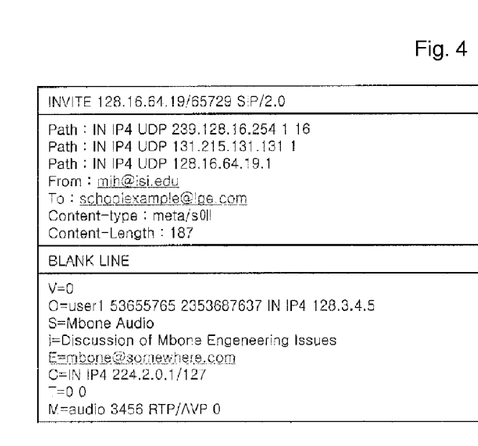
FIG. 4 is a view illustrating an exemplary SIP message using the SIP MESSAGE format of FIG. 3.

FIG. 3 illustrates a format of a SIP message, and FIG. 4 illustrates an example of a SIP message using the SIP message format shown in FIG. 3. As illustrates in FIGS. 3a and 3b, 'METHODS' indicates a message starting line for describing a type of message (i.e., INVITE in FIG. 4), a request ID (i.e., 128.16.64.09/65729 in FIG. 4), and a SIP version (i.e., SIP/2.0 in FIG. 4). 'HEADER' of the SIP is composed of one or more addresses of nodes routed (i.e. path), addresses of sender and receiver, and sequential number and TTL indicating the number of times being connected to the same address. In order to define the PATH value included in the header within a network, the message should be able to be modified in a message sending process, which causes a security related problem with respect to the message. 'BLANK LINE' describes a boundary between the header and a message body. 'MESSAGE BODY' indicates a place for receiving and sending a content of the message and an attribute value required for a communication.

A negotiation process for setting up (establishing) the session between originating end and terminating end through the SIP message in the format shown in FIG. 3 is disclosed in IMS Specification TS 23.228, that is, in which end users (i.e., users of the originating and terminating ends) have different capabilities and preferences depending on end users communication states (e.g., depending on who has requested the session setup, or the current state the terminating end is faced with, or when media format requested by the originating end is different from one preferred by the terminating end. In such cases, in order to set a more satisfactory session, provided is a section with respect to a capability which the originating end prefers and a capability which the originating end can currently support. Accordingly, the terminating end can accept or reject an incoming session in consideration of the current communication state. The originating end can use the SIP/SDP protocol to thus request the session setup from the terminating end by including in a particular parameter media formats (e.g., audio, video, text, white board, etc.) and a codec which the originating end intends to use together with the terminating end through the corresponding session. The terminating end selects or rejects acceptable capabilities (e.g., media formats, codecs, etc.) according to the protocol.

DISCLOSURE OF INVENTION

Technical Problem

However, in case of the session setup protocol provided in the related art IMS, the session setup is simply requested based upon the preferences and capabilities of the originating end, and the terminating end can only accept (or select) or reject the session setup request. Accordingly, in the point of view of the terminating end, it is impossible for the terminating end to more flexibly deal with the request of the originating terminal according to the current communication condition of the terminating end. That is, as described in the IMS Specification TS 23.228, there is a technical limitation which means that the terminating end user must simply accept or reject the session setup request by the originating end without considering its preferences or the currently available capabilities.

Technical Solution

Therefore, it is an object of the present invention to provide a SIP based session setup method in a process for setting a SIP based session required for the IMS service, in which a negotiation of a session setup for more efficiently using an IMS service can be performed by allowing a terminating user to send his preferable capability or its supportable (or available) capability to an originating user, and an terminal thereof.

To achieve this object, there is provided a SIP based session setup method in a session setup process executed among terminals in a SIP based network which includes at least one or more terminals and at least one or more entities, the method comprising sending a SIP INVITE message from a first terminal to a second terminal, receiving and analyzing the INVITE message by the second terminal, and including a certain service condition in a SIP RESPONSE message from the second terminal to the first terminal.

Preferably, the SIP based session setup method may further comprise analyzing the service condition included in the received SIP RESPONSE message and recomposing a SIP INVITE message accordingly to thus send the recomposed SIP INVITE message from the first terminal to the second terminal.

According to another embodiment of the present invention, there is provided a SIP based session setup method in a session setup process executed among terminals in a SIP based network including at least one or more terminals and at least one or more entities, the method comprising sending a SIP INVITE message including a capabilities list from a first terminal to a second terminal, receiving the SIP INVITE message, by the second terminal, to thereafter analyze the capabilities list within the SIP INVITE message, selecting a capability preferred by the second terminal or a capability supported by the second terminal from the analyzed capabilities list, including a service condition requested by the second terminal together with the selected capability in a SIP RESPONSE message, by the second terminal, to then send the SIP RESPONSE message to the first terminal.

According to still another embodiment of the present invention, there is provided a SIP based session setup method in a SIP session setup among terminals in a SIP based network including at least one or more entities and at least one or more terminals, the method comprising (a) sending a SIP INVITE message from a first terminal to a second terminal, (b) receiving the SIP INVITE message by a first network entity, (c) analyzing the SIP INVITE message, by the first network entity, to thereby check a service condition of the second terminal registered in a second network entity, and (d) including the service condition in a SIP RESPONSE message, by the first network entity, to then send the SIP RESPONSE message to the first terminal.

Preferably, the SIP based session setup method may further comprise analyzing the SIP RESPONSE message by the first terminal to thereafter recompose a SIP INVITE message to the second terminal.

Preferably, the SIP based session setup method may further comprise including the service condition requested by the second terminal in a SIP REGISTER message to then send the SIP REGISTER message from the second terminal to the first network entity, and registering the service condition within the SIP REGISTER message in the second network entity by the first network entity.

To achieve these and other advantages and in accordance with the purpose of the present invention, an terminal for setting a SIP based session through an IMS server, receives a SIP INVITE message from an originating end and thereafter sends a certain service condition for a session setup to the originating end.

BRIEF DESCRIPTION OF THE DRAWINGS

FIG. 6 is a view illustrating an exemplary SIP INVITE message sent from a originating-end terminal in accordance with a first embodiment of the present invention;

FIG. 7 is a view illustrating an exemplary SIP RESPONSE message sent from a terminating-end terminal in accordance with a first embodiment of the present invention;

MODE FOR THE INVENTION

Reference will now be made in detail to the preferred embodiments of the present invention, examples of which are illustrated in the accompanying drawings. It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

In an Session Initiation Protocol (SIP) based session setup, the present invention is basically directed to realize a SIP based session setup capable of setting a session more efficiently between originating and terminating ends by sending preferences and capabilities related to a terminating user through a SIP RESPONSE message. Such basic concept of the present invention can be applied to a negotiation process with respect to a session setup for using an IMS service, that is, a process for establishing an actual bearer between end users to execute the SIP session setup for using the IMS service. Explanation will now be given based upon embodiments in which the present invention is applied to the IMS service.

Furthermore, main terms used for explaining the embodiments according to the present invention will first be described hereafter.

A terminal denotes a mobile communication terminal which inclusively includes devices such as mobile phones, cellular phones, or user equipment (UEs). Also, the terminal may include every device capable of using the IMS service.

Capability information denotes information related to a capability for a session connection between end users. The capability includes information related to at least one or more media formats or to at least one or more codecs which are preferred by one terminal (i.e. an originating terminal or a terminating terminal). The capability also includes information related to at least one or more media formats or to at least one or more codecs supported by one terminal. However, the capability may include other things in addition to the media format or codec.

A capabilities list may include at least one or more capabilities preferred or supported by one terminal to thus allow the one terminal (i.e., the originating terminal or terminating terminal) to connect (establish) a SIP based session.

A service condition denotes capability information preferred by a certain terminal (or a device, namely, the originating terminal or terminating terminal) or capability information supported (or used) by the one terminal.

However, the terms aforementioned are assumed to explain the embodiments of the present invention more conveniently, but may not restrict or limit the scope of the present invention.

Based upon the assumed terms, the basic concept of the present invention can be implemented by first through fourth embodiments hereafter. However, the first through fourth embodiments according to the present invention may be illustrated to implement an exemplary SIP session setup for using the IMS service by establishing an actual bearer between end users, but it does not mean that the technical scope of the present invention is restricted by those embodiments.

Description will now be made for constructions and operations shown in embodiments of the present invention with reference to the attached drawings.

Figure 5:
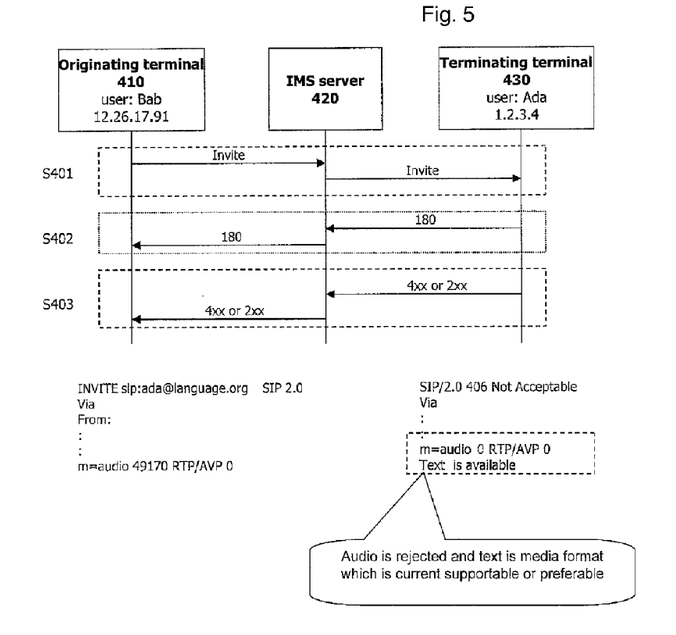
FIG. 5 is a view illustrating components of the present invention and a signal flow among the components in accordance with a first embodiment according to the present invention.

FIG. 5 is a view illustrating components of the present invention and a signal flow among the components in accordance with a first embodiment of the present invention. FIG. 5, however, just illustrates main components for explaining the present invention, namely, an originating terminal 410, an IMS server 420 and a terminating terminal 430, and other network components may be omitted for a brief explanation. Therefore, a detailed procedure for setting up a session among the main components (e.g., call session controlling units such as P-CSCF and S-CSCF) of the IMS network can be understood by those skilled in the technical field of the present invention, to thus be omitted for a brief explanation of the present invention.

FIG. 6 illustrates an exemplary INVITE message sent from an originating terminal in accordance with a first embodiment of the present invention.

FIG. 7 illustrates an exemplary RESPONSE message sent from a terminating terminal in accordance with a first embodiment of the present invention.

As illustrated in FIGS. 4*a* through 4*c*, a user (i.e., Bab) of an originating terminal 410 establishes an actual bearer with a user (i.e., Ada) of a terminating terminal 430 to thus set up a SIP based session therebetween for using an IMS service. That is, the originating terminal 410 uses a SIP INVITE message, as shown in FIG. 6, to send a capability (e.g., audio as a media format) requested by the user (i.e., Bab) of the originating terminal 410 to the terminating terminal 430 via an IMS server 420 (S401). The terminating terminal 430 receives the SIP INVITE message from the originating terminal 410 and in response to the SIP INVITE message it sends a response message (i.e., 180 message in FIG. 5) to the terminating terminal 430 (S402). The originating terminal 410 then sends the SIP RESPONSE message to the terminating terminal 410, the SIP RESPONSE message including a service condition (i.e. a text) (S403). Here, the SIP RESPONSE message can be one of a positive message (e.g., 2xx in FIG. 5), a negative message (e.g., 4xx in FIG. 5), or another separately defined RESPONSE message. However, the step S402 may be changed depending on a communication state, and accordingly may not be necessarily performed.

Hereinafter, determination and decision of the terminating terminal 430 with respect to the SIP INVITE message request of the originating terminal 410 will now be explained in more detail.

After the terminating terminal 430 receives the SIP INVITE message from the originating terminal 410, the user (i.e. Ada) of the terminating terminal 430 may be in a state that the service condition requested using the SIP INVITE message; that is, a capability preferred by the originating terminal 410 or a capability supported by the originating terminal 410 (i.e., the media format is 'audio' in FIG. 6) is not acceptable (i.e., the capability must be rejected). The user (i.e. Ada) may be in a state that the terminating terminal 430 can accept the service condition requested by the originating terminal 410 but it (i.e., the terminating terminal 430) nevertheless intends to communicate with the originating terminal 410 under another service condition (i.e., another media format or another codec).

For the non-acceptable state of the two states, first, the terminating user (i.e., Ada) may be currently in conference or in a noisy place, and thus it may be difficult for the terminating user to communicate with the originating user (i.e., Bab) based upon the capability (i.e., 'audio' for the media format) requested by the originating end. At the moment, the terminating terminal 430 sends to the originating terminal 410 a SIP RESPONSE message (i.e., a type of message corresponding to a message value '4xx' or '6xx' in FIG. 1) which corresponds to a negative message indicating a rejection of the capability requested by the originating end. However, the terminating terminal 430 sends to the originating terminal 410 the SIP RESPONSE message (i.e., 4xx or 6xx) which includes a service condition of the terminating terminal 430 in order to set up a session therebetween more efficiently (S403). That is, the terminating user (i.e. Ada) does not simply reject the capability (i.e., 'audio' for the media format) included in the SIP INVITE message requested by the originating user (i.e., Bab), but sends to the terminal 410 belonging to the originating user (i.e., Bab) the SIP RESPONSE message (i.e., the negative message) of FIG. 7 including a service condition (e.g., 'text' for the media format in FIG. 5) requested by the terminating user (i.e., Ada). Here, the service condition requested by the terminating terminal 430 may be included in a body of the SIP RESPONSE message (i.e., the message shown in FIG. 7). the SIP RESPONSE message is sent to the originating terminal 410 via the IMS server 420.

Afterwards, the originating user (i.e., Bab) analyzes the SIP RESPONSE message including the service condition of the terminating terminal 430, and then composes a RE-INVITE message for a SIP session setup to send it to the terminating terminal 430. Here, the originating terminal 410 selects the service condition (i.e., 'text' for the media format) requested by the terminating terminal 430. The originating terminal 410 then composes the RE-INVITE message based upon the selected service condition and thereafter sends the composed RE-INVITE message to the terminating terminal 430. Or, the originating terminal 410 composes the RE-INVITE message for requesting the session setup based upon another capability to thus send it to the terminating terminal 430.

On the other hand, the terminating terminal 430, as shown in FIG. 7, has sent the SIP RESPONSE message (i.e., the negative message) to the originating terminal 410. Besides, the terminating terminal 430 can send a certain service condition (e.g., capability information including a media format preferred by the terminating terminal, a codec supported thereby, or the like) to the originating terminal 410 through all of the SIP messages (i.e., types of messages respectively corresponding to the message values 1xx through 6xx in FIG. 1) in addition to the positive message (i.e., 2xx) or a separately defined RESPONSE message.

Figure 8:
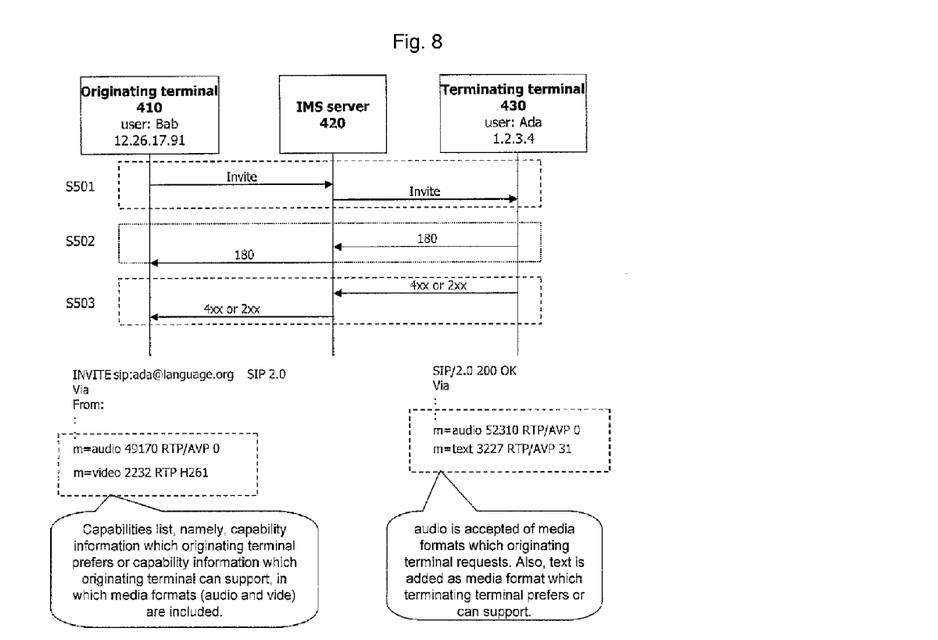
FIG. 8 is a view illustrating components of the present invention and a signal flow among the components in accordance with a second embodiment of the present invention.

FIG. 8 is a view illustrating components of the present invention and a signal flow among the components in accordance with a second embodiment of the present invention. However, the components illustrated in FIG. 8 are the same as those in FIG. 5. Therefore, a reference numeral, a function and an operation of each component may be the same as those of each component in FIG. 5.

The second embodiment of the present invention illustrated in FIG. 8 will now be briefly explained. That is, after receiving the SIP INVITE message including a capabilities list from the originating terminal 410, the terminating terminal 430 sends to the originating terminal 410 a service condition requested to set up a session through the SIP RESPONSE message (i.e., the positive message).

Hereinafter, the second embodiment of the present invention will now be explained in more detail with reference to FIG. 8.

The originating terminal 410 sends a SIP INVITE message including a capabilities list (e.g., at least one or more media formats or at least one or more codecs) to the terminating terminal 430 via the IMS server 420 (S501).

The terminating terminal 430 analyzes the received SIP INVITE message to then send to the originating terminal 410 a message in response to the received SIP INVITE message (S502). However, the step S502 may be changeable according to a communication state and thus may not be necessarily performed.

The terminating terminal 430 may accept or select a media format (i.e. 'audio' in FIG. 8) preferred by the user (i.e. Ada) of the terminating terminal 430 from the capabilities list (e.g., 'audio' and 'video' for the media format in FIG. 8) requested by the originating terminal 410. Further, the terminating terminal 430 may add its preferable capability information or its supportable capability information, namely, a service condition (i.e., 'text' in FIG. 8) to the SIP RESPONSE message (i.e., positive message 2xx), and then sends the SIP RESPONSE message to the originating terminal 410 (S503). But, when the terminating terminal 430 intends to reject every capability included in the capabilities list (i.e., 'audio' and 'video') requested by the originating terminal 410, the terminating terminal 430 may include the service condition (i.e. 'text' in FIG. 8) in the SIP RESPONSE message (i.e., 4xx or 6xx as the negative message) and then sends the SIP RESPONSE message to the originating terminal 410.

Afterwards, the originating terminal 410 analyzes the received SIP RESPONSE message and then composes a SIP RE-INVITE message which includes or ignores the added service condition (i.e., 'text' other than the primarily requested capabilities list (i.e. 'audio' and 'video'). The originating terminal 410 then sends the composed SIP RE-INVITE message to the terminating terminal 430 to thus execute the SIP session setup therebetween.

The second embodiment of the present invention, on the other hand, may be compared to the first embodiment thereof as follows.

The first and second embodiments are similar to each other in respect of setting up the SIP session between end users (i.e., the originating user and the terminating user) in order to use the IMS service by establishing the actual bearer between the originating terminal 410 and the terminating terminal 430.

However, the second embodiment is different from the first embodiment as follows. First, regarding the second embodiment, the terminating terminal 430 receives the SIP INVITE message including the capabilities list (i.e., the media formats, codecs or the like) from the originating terminal 410. Second, the terminating terminal 430 analyzes the received capabilities list, and then selects the capability preferred by the user (i.e., Ada) of the terminating terminal 430 or the capability (i.e., 'audio' in FIG. 8) supported by the terminating terminal 430 from the capabilities (i.e., 'audio' and 'video' in FIG. 8) included in the analyzed capabilities list. Third, the terminating terminal 430 may send to the originating terminal 410 the SIP RESPONSE message corresponding to the positive message (e.g., 2xx), herein the SIP RESPONSE message including both the service condition (i.e., 'text' in FIG. 8) requested by the terminating terminal 430 and the selected capability (i.e., 'audio').

In addition, the SIP RESPNSE message sent from the terminating terminal 430 in the second embodiment of the present invention may correspond to one message of the positive message (i.e., 200 OK), all of the messages based upon the SIP (i.e., the types of message respectively corresponding to the message values 1xx through 6xx shown in FIG. 1), and a separately defined RESPONSE message. The service condition requested by the terminating terminal 430, namely, the capability information preferred by the terminating terminal 430 or the capability information supported by the terminating terminal 430, may be included in an SDP body of the SIP RESPONSE message using a certain parameter.

Thus, with reference to the first and second embodiments of the present invention, explanations have been given of including the service condition (e.g., the media format) requested by the terminating terminal 430 in the SDP body of the SIP based RESPONSE message to thus be sent to the originating terminal 430.

Now, the third embodiment of the present invention can be implemented such that a new parameter (referred to as Retry-As) is defined, a service condition (namely, at least one or more capability information preferred by the terminating terminal 430 or at least one or more capability information supported by the terminating terminal 430) requested by the terminating terminal 430 is included in the new parameter, and the parameter is included again in a body or a header of the SIP RESPONSE message (or a body or header of a separately defined RESPONSE message), thereafter sending the SIP RESPONSE message to the originating terminal 410.

The third embodiment of the present invention may be similar to the first and second embodiments of the present invention in respect of the SIP session setup process for using the IMS service by establishing the actual bearer between the end users. Therefore, the signal flow (S601 through S603) shown in FIG. 9 for the SIP session setup may be the same as the signal flow (S401 through S403 in FIG. 5) in the first embodiment of the present invention and the signal flow (S501 through S503 in FIG. 8) in the second embodiment of the present invention.

However, the third embodiment may be different from the first and second embodiments as follows. That is, the service condition requested by the terminating terminal 430 may be included in the newly defined parameter Retry-As. In addition, the terminating terminal 430 may include the parameter Retry-As in a certain SIP RESPONSE message of a separately defined SIP RESPONSE message or the SIP RESPONSE message (e.g., 4xx or 5xx). In this case, the parameter Retry-As may be included in the body or header of the SIP RESPONSE message to thus be sent to the originating terminal 410. Accordingly, the repeated parts (i.e., signal flow related with the first and second embodiments aforementioned) already described with the first and second embodiments of the present invention may be adapted and thus those in the third embodiment of the present invention will be omitted to briefly explain the present invention. Thus, comparable parts of the third embodiment with the first and second embodiments will now be explained with reference to FIG. 9.

Figure 9:
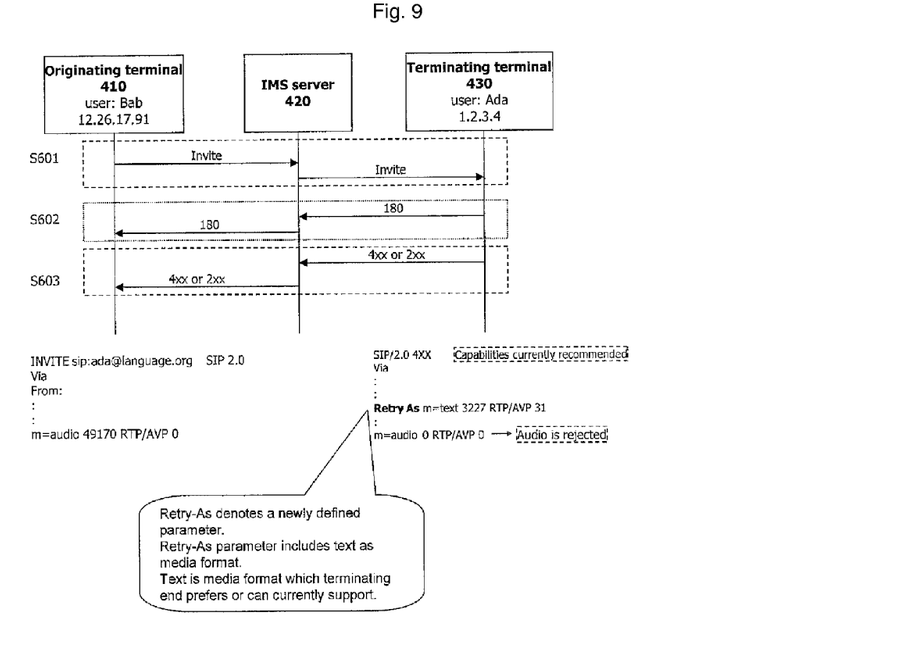
FIG. 9 is a view illustrating components of the present invention and a signal flow among the components in accordance with a third embodiment of the present invention.

FIG. 9 is a view illustrating components of the present invention and a signal flow among the components in accordance with a third embodiment of the present invention.

As illustrated in FIG. 9, the service condition (i.e., 'text' for the media format in FIG. 9) which the terminating terminal 430 currently requests is included in a certain parameter (i.e., Retry-As in FIG. 9) in certain exemplary cases: in a case that the terminating terminal 430 can not accept the capability (i.e., 'audio' for the media format in FIG. 9) which the user (i.e., Bab) of the originating terminal 410, or in another case that the user (Bab) of the terminating terminal 430 can accept the requested capability but he nevertheless prefers another capability (e.g., 'text'). The certain parameter which includes the service condition (i.e., 'text') is then included in a body or header of the SIP RESPONSE message (e.g., 4xx or 2xx in FIG. 9) to thus be sent to the originating terminal 410. The certain parameter Retry-As, on the other side, may be included in the body or header of a RESPONSE message which is separately defined other than the SIP RESPONSE message described in Table 1, to thus be sent to the originating terminal 410.

Figure 10:
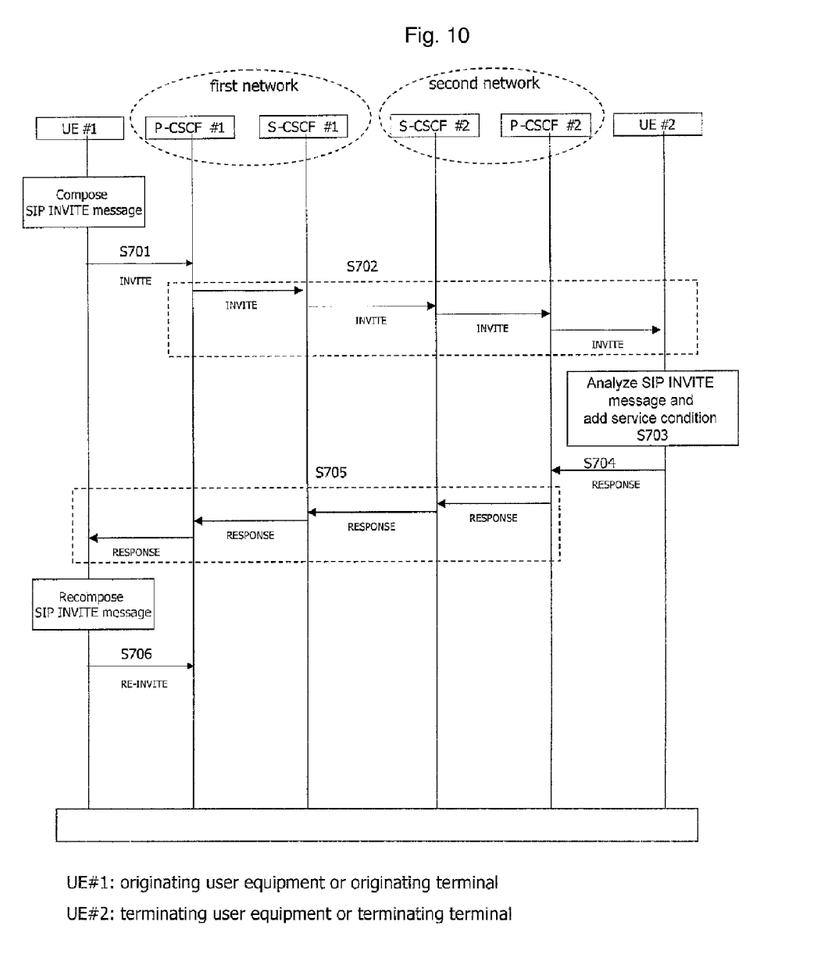
FIG. 10 is a view illustrating components of the present invention and a signal flow among the components indicating a SIP based session setup for using an IMS service in accordance with an embodiment of the present invention.

FIG. 10 is a view illustrating components of the present invention and a signal flow among the components indicating a SIP based session setup for using an IMS service in accordance with an embodiment of the present invention. That is, FIG. 10 illustrates that the first through third embodiments aforementioned are applied to entities of an actual IMS network.

As illustrated in FIG. 10, an originating terminal (i.e., UE#1) sends capability information preferred by the originating terminal UE#1 or capability information supported thereby (e.g., at least one or more media formats, at least one or more codecs, or the like) to a certain entity (i.e., P-CSCF#1) of a first network using a SIP INVITE message so as to set up a SIP session (S701).

The SIP INVITE message is sent to a terminating terminal (i.e., UE#2) sequentially passing through network entities, namely, an S-CSCF#1 of the first network, an S-CSCF #2 of a second network and a P-CSCF#2 of the second network (S702).

The terminating terminal UE#2 receives the SIP INVITE message and analyzes the capability information included in the message. Thereafter, the terminating terminal UE#2 determines a service condition based upon the capability information preferred by the originating terminal UE#1 or the capability information supported by the originating terminal UE#1 by considering its current state (S703). The terminating terminal UE#2 then sends the service condition determined in the step S703 using a SIP RESPONSE message. In this case, the terminating terminal UE#2 adds (includes) its service condition (i.e., its preferable capability information or its supportable information for the session setup) into the SIP RESPONSE message, and then sends it to a certain entity (i.e., P-CSCF#2) of the second network (S704). Here, the SIP RESPONSE message includes not only the SIP negative message such as a type of message corresponding to the message value '4xx' or '6xx' in Table 1 but also the SIP positive message such as '200 OK' message in Table 1. In addition, the SIP RESPONSE message may correspond to the SIP RESPONSE message described in the third embodiment of the present invention (e.g., all of the RESPONSE messages described in Table 1 or a separately defined RESPONSE message). The SIP RESPONSE message may also be a message including the newly defined parameter (i.e., Retry-As in FIG. 9) in the header or body thereof. Here, the newly defined parameter may include the service condition (e.g., at least one or more media formats or at least one more codecs, or the like) requested by the terminating terminal UE#2 to thus set up the SIP session.

After executing the step S704, the SIP RESPONSE message is sent to the originating terminal UE#1 sequentially passing through the S-CSCF#2 of the second network, an S-CSCF#1 of the first network and the P-CSCF#1 of the first network (S705).

The originating terminal UE#1 receives the SIP RESPONSE message, and analyzes and determines a currently available service condition of the terminating terminal UE#2 to thus recompose an INVITE message (i.e., a RE-INVITE message) for sending accordingly. Otherwise, the originating terminal determines the currently available service condition of the terminating terminal UE#2 to thus set up the SIP session (S706). After executing the step S706, the steps S701 through S705 are repeatedly performed or the related art session setup procedure is performed in the SIP based session setup procedure for using the IMS service.

Regarding the signal flow illustrated in FIG. 10, on the other side, when the originating and terminating terminals UE#1 and UE#2 belong to the different networks (i.e., the first network and the second network), the procedure for setting up the SIP based session is performed between the originating terminal UE#1 and terminating terminal UE#2 via at least one or more entities. In addition, when both of the originating terminal UE#1 and terminating terminal UE#2 belong to the same network (e.g., the first network or the second network), the SIP based session setup can be performed between the originating terminal UE#1 and terminating terminal UE#2 via at least one or more entities. Here, the SIP based session setup procedure between the originating terminal UE#1 and terminating terminal UE#2 may be implemented by performing the steps S701 through S706 as same as aforementioned, but there may be difference in passing entities through which the terminals (i.e., UE#1 and UE#2) pass in order to set up the SIP based session. That is, both of the originating terminal UE#1 and terminating terminal UE#2 exist in the same network (e.g., it is assumed that both of the originating terminal and the terminating terminal currently exist in the first network), and accordingly a certain entity to be passed through for the session setup between the originating terminal and terminating terminal may be limited on the entities disposed in the first network (i.e., P-CSCF#1 and S-CSCF#1). In other words, a certain signal (i.e., the INVITE message) in the SIP based session setup for using the IMS service may sequentially pass through the originating terminal UE#1, the proxy call control unit (i.e., the P-CSCF#1), and the service call session control unit (i.e., S-CSCF #1). A certain signal (i.e., the RESPONSE message) in the SIP based session setup for using the IMS service may sequentially pass through the terminating terminal UE#2, the service call session control unit (i.e. the S-CSCF#1), and the proxy call session control unit (i.e., the P-CSCF#1).

Figure 11:
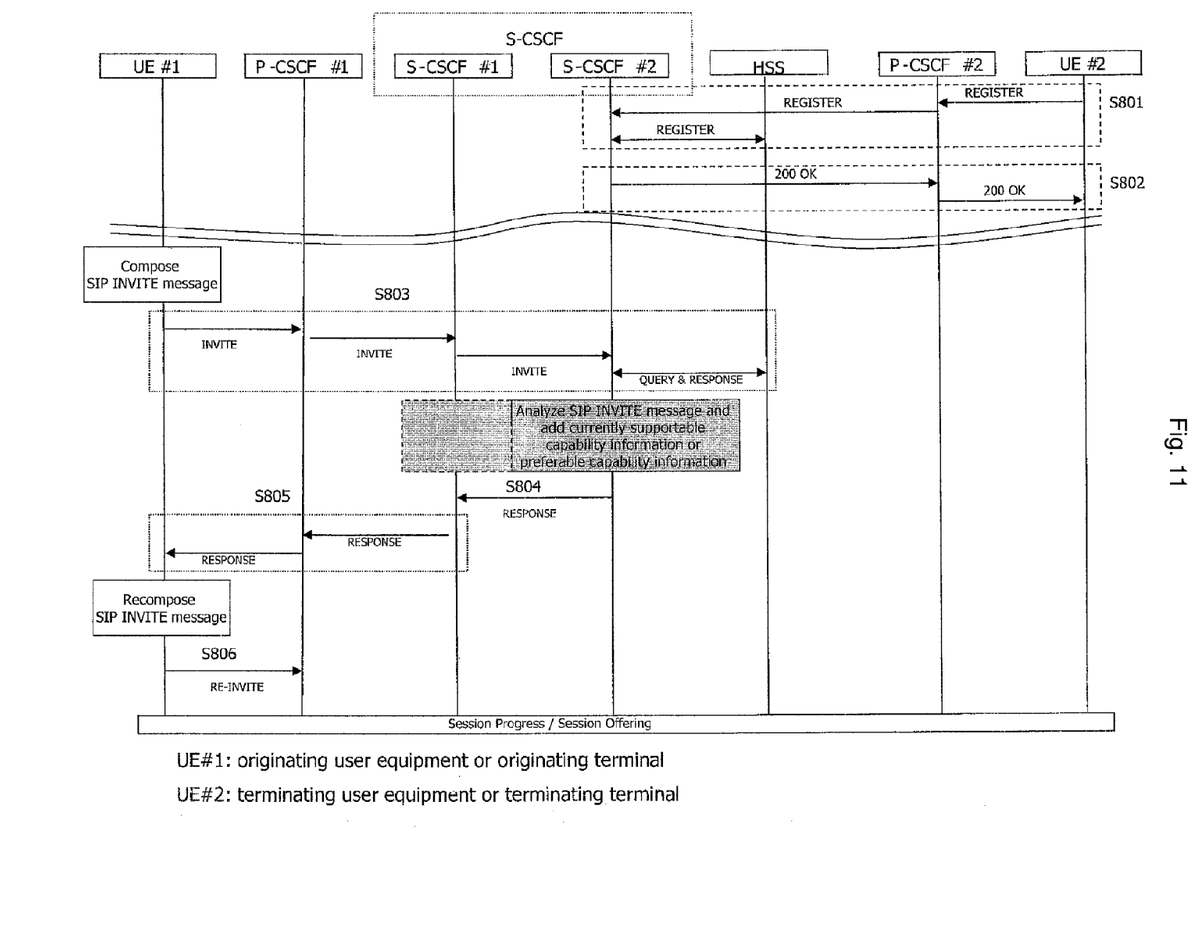
FIG. 11 is a view illustrating components of the present invention and a signal flow for a SIP based session setup to use an IMS service among the components in accordance with a fourth embodiment of the present invention.

FIG. 11 is a view illustrating components of the present invention and a signal flow for a SIP based session setup to use an IMS service among the components in accordance with a fourth embodiment of the present invention.

The fourth embodiment of the present invention may be characterized as follows as compared to the first through third embodiments of the present invention. That is, in the first through third embodiments of the present invention, the terminating terminal UE#2 determines the service condition requested by itself (the terminating terminal UE#2) for setting the session and then sends the determined service condition to the originating terminal UE#1, wherein the service condition denotes at least one or more capability information preferred by the terminating terminal UE#2 or at least one or more capability information supported by the terminating terminal UE#2 (e.g., at least one or more media formats or at least one or more codecs). On the other hand, in the fourth embodiment of the present invention, a certain entity (e.g., the call session control unit) of the IMS network sends to the originating terminal UE#1 the service condition requested by the terminating terminal UE#2 to thus perform the negotiation process for the SIP based session setup so as to use the IMS service. Hereinafter, the fourth embodiment of the present invention will now be explained in more detail with reference to FIG. 11.

Regarding the fourth embodiment of the present invention, the procedures (i.e., S801 and S802) must be previously performed to register the service condition (at least one or more media formats or at least one or more codecs as capability information) which the terminating terminal UE#2 requests in a certain entity (i.e., an HSS) of the IMS network.

That is, the user of the terminating terminal UE#2 may register at least one or more capability information preferred by the user or at least one or more capability information supported by his terminating terminal UE#2 (i.e., the service condition) in the HSS through the SIP REGISTER message (S801). To explain the step S801 in more detail, the SIP REGISTER message (which includes the service condition requested by the terminating terminal UE#2 for the SIP based session setup) is sent to another entity (i.e., the S-CSCF#2) of the second network via a certain entity (i.e., the P-CSCF#2) of the second network. The S-CSCF#2 registers the service condition within the SIP REGISTER message in the HSS.

The S-CSCF#2 completely registers the service condition in the HSS to thereafter send a 200 OK message to the terminating terminal UE#2 via the P-CSCF#2 (S802). However, the time for registering the service condition of the terminating terminal UE#2 for a consecutive session setup through the steps S801 and S802 is flexible. That is, the user can perform the registration when the user buys mobile terminal to operate it initially or while using his terminal.

After the S-CSCF#2 registers the service condition of the terminating terminal UE#2 for the consecutive session setup in the HSS, the originating terminal UE#1 composes a SIP INVITE message for requesting the SIP based session setup in order to use the IMS service and sends the composed SIP INVITE message to a target terminal (i.e., the terminating terminal UE#2) sequentially via certain entities of the IMS network (i.e., the P-CSCF#1 of the first network, the S-CSCF#1 of the first network and the S-CSCF#2 of the second network). The sent SIP INVITE message is received in the S-CSCF#2 finally (S803).

The S-CSCF#2 analyzes the capability information requested by the terminating terminal UE#1 (e.g., media formats or codecs which the originating terminal UE#1 prefers or can support), the capability information being included within the SIP INVITE message. If the SIP INVITE message corresponds to an INVITE message targeting the terminating terminal UE#2, the S-CSCF#2 checks (or compares) the service condition of the terminating terminal UE#2 previously-registered in the HSS. The S-CSCF#2 includes the service condition in a SIP RESPONSE message to thus send it to a certain entity of the first network (i.e., the S-CSCF#1 of the first network) (S804).

Then, the SIP RESPONSE message is sent to the originating terminal UE#1 via a certain entity of the first network (i.e., the P-CSCF#1 of the first network) (S805).

The originating terminal UE#1 receives the SIP RESPONSE message to analyze the service condition requested by the terminating terminal UE#2. The originating terminal UE#1 recomposes a SIP INVITE message (i.e., a RE-INVITE MESSAGE and then sends the recomposed SIP INVITE message to a certain entity of the first network (i.e., the P-CSCF#1) (S806). Here, the originating terminal UE#1 selects (or accepts) the capabilities, which the originating terminal UE#1 itself prefers or can support, from the service condition requested by the terminating terminal UE#2, and then includes the selected capabilities in the RE-INVITE message. The originating terminal UE#1 then sends the RE-INVITE message to the target terminal UE#2 to thus perform the SIP based session setup for using the IMS service.

The SIP RESPONSE message sent from the certain entity S-CSCF#2 may be the positive message or the negative message. The message (i.e., the SIP RESPONSE message corresponding to the positive or negative message) may be sent by including the service condition of the terminating terminal UE#2 (i.e., the service condition registered in the HSS). As illustrated in the third embodiment, the service condition is included in the newly defined parameter Retry-As. The parameter Retry-As may be sent by being included in a body or header of the SIP RESPONSE message (or a separately defined RESPONSE message). On the other hand, FIG. 11 can show such that the originating terminal UE#1 and terminating terminal UE#2 respectively exist in different networks (i.e., the first network and the second network), and accordingly messages for setting up the SIP based session are sent via entities belonging to the different networks. However, if both of the originating terminal UE#1 and terminating terminal UE#2 exist in the same network (i.e., the first network or the second network), the entities S-CSCF#1 and S-CSCF#2 shown in FIG. 11 may be not classified but one entity S-CSCF may be provided. The entity S-CSCF may act as a home of both the originating terminal UE#1 and terminating terminal UE#2.

As described above, upon setting the SIP based session for using the IMS service, the service condition requested by the terminating user (i.e., the at least one or more capability information preferred by the terminating end or the at least one or more capability information supported by the terminating end) is included in the SIP RESPONSE message (e.g., the SIP RESPONSE message corresponding to the negative or positive message) to be then sent. Accordingly, the terminating user can more actively take part in the setting up of the SIP based session. In addition, the originating user detects the terminating user's intention for the SIP based session setup, and accordingly can effectively recompose the SIP INVITE message to thus retry the SIP based session setup for IMS service with the terminating user. Therefore, in the present invention, by performing the negotiation process for actively setting the session between originating user and terminating user, namely, between the end users, it is effective to provide a more efficient SIP based session setup procedure to the end users to intend to use the IMS service.

The invention claimed is:

1. A Session Initiation Protocol (SIP) based session setup method in a session setup process performed between terminals in a SIP based network which includes at least one or more of the terminals and at least one or more network entities, the method comprising:

receiving, by a terminating terminal, a SIP INVITE message sent from an originating terminal, which requests establishment of a session for an Internet Protocol Multimedia Subsystem (IMS) service with the terminating terminal, via at least one or more network entities including an IMS server, the SIP INVITE message including capability information, the capability information including at least one or more media formats that are preferred by the originating terminal;

analyzing, by the terminating terminal, the capability information within the received SIP INVITE message;

determining, by the terminating terminal, a service condition based on the analyzed capability information, the service condition indicating capability information preferred by or supported by the terminating terminal, wherein the service condition includes a media format not included in the capability information and the step of determining the service condition further comprises:

if the terminating terminal accepts at least one capability from the analyzed capability information;

selecting capabilities which the terminating terminal prefers or can support from the analyzed capability information; and including the service condition and the selected capabilities in a SIP RESPONSE message; and if the terminating terminal rejects every capability from the analyzed capability information, including the service condition in the SIP RESPONSE message;

sending, by the terminating terminal, a SIP RESPONSE message including the service condition to the originating terminal via the at least one or more network entities including the IMS server, wherein the service condition is included in a parameter 'Retry-AS' that is included in a body or header within the SIP RESPONSE message, wherein sending of the SIP RESPONSE message provides the terminating terminal with additional options other than only accepting or only rejecting the session requested from the originating terminal, said additional options being based on preferences of the terminating terminal or available capabilities at the terminating terminal, and wherein the capability information includes at least one or more media formats and at least one or more codecs preferred by or supported by the terminating terminal;

receiving, by the originating terminal, the SIP RESPONSE message;

analyzing, by the originating terminal, the SIP RESPONSE message;

composing a SIP RE-INVITE message by the originating terminal based upon the analysis; and sending, by the originating terminal, the SIP RE-INVITE message to the terminating terminal, wherein the SIP RE-INVITE message includes the service condition.

2. The method of claim 1, wherein the SIP RESPONSE message is a separately defined RESPONSE message.

* * * * *